Patented Mar. 30, 1954

2,673,845

UNITED STATES PATENT OFFICE 2,673,845

TROWELABLE SYNTHETIC RUBBER ADHESIVES

Hilbert L. Stevens, Lancaster, Pa., assignor to Armstrong Cork Company, Lancaster, Pa., a corporation of Pennsylvania No Drawing. Application October 10, 1951,
Serial No. 250,785

7 Claims. (Cl. 260—27)

This invention relates to adhesive compositions containing synthetic rubbers. More particularly, the invention relates to an adhesive composition containing a particular class of cross-linked synthetic rubbers, which compositions are capable of being trowelled.

Trowellable adhesives are used in a number of arts. One particular use of such compositions is in connection with the installation of various types of floor covering to various types of subfloors. In addition, such adhesives are employed in the installation of wall coverings.

In order to obtain the desired bond with the least amount of difficulty, it is generally the practice to utilize a material which can be trowelled. Such materials are characterized by a short buttery consistency and are of such a nature that they do not string under the trowel. The materials can be spread readily with a notched trowel, thereby enabling the applicator to control the film thickness.

One well-known method of producing such compositions involves the use of a rather high solids content therein, which is obtained by incorporation of fillers. However, when fillers are employed, the incorporation requires careful control to obtain the correct binder-to-filler ratio, and considerable adjustment is sometimes necessary to produce the right trowelling properties without affecting film properties. In many instances, hydrophilic clays are used as fillers, and such materials have relatively high absorbent properties, which at times detract from the water resistance of the material.

In accordance with my invention, trowellable adhesives with comparatively low solids content are obtained by compounding a resinous material with a particular class of synthetic rubbers. These synthetic rubbers are rubberlike polymers containing a small amount of cross-linked divinyl benzene, divinyl naphthalene, or a diphenyl or a di-(alpha-methyl) vinyl or di-(alpha-ethyl) vinyl homologue thereof. Such compounds are illustrated by the following general formula:

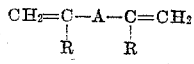

where A may be an aryl nucleus, such as phenylene, naphthalene, or diphenylene; and R may be hydrogen, a methyl group, or an ethyl group. Examples of such compounds are: o-divinyl benzene, m-divinyl benzene, p-divinyl benzene, 1,2-divinyl naphthalene, 1,4-divinyl naphthalene, 1,8-divinyl naphthalene, o-di-isopropenyl benzene, p-di-(alpha-ethyl vinyl) benzene, 4,4'-divinyl diphenyl. The preferred compound is divinyl benzene, but any of the compounds illustrated above may be used, either alone or in combination with each other.

In order to produce the cross-linked polymer, the compound corresponding to the above formula is mixed in small quantities with the synthetic rubber ingredient prior to the final stage of polymerization; and polymerization is carried out in the customary manner according to known methods, at least part of the polymerization being performed in the presence of a small quantity of the selected compound or mixtures thereof. The compounds may be added to the synthetic rubber ingredients at the initial stage of mixture of the monomers in amounts between 0.01 and 0.5 part by weight, based on 100 parts of total synthetic rubber content; or they may be added to a synthetic rubber compound prior to complete of final polymerization at a later stage in the polymerization process so that further polymerization has the effect of interpolymerizing or chemically combining the selected compounds with the other synthetic rubber constituent or constituents.

Examples of synthetic rubber producing polymerizable materials which may be used in producing the cross-linked polymer are the butadiene-1,3, such as butadiene-1,3; 2-methyl-butadiene-1,3 (isoprene); 2,3-dimethyl-butadiene-1,3; piperylene; 2-chloro-butadiene-1,3 (chloroprene) and mixtures thereof; and mixtures of such butadiene-1,3 with other polymerizable compounds which are capable of forming rubbery copolymers with butadiene-1,3; for example, up to 70% by weight of such mixture of compounds which have a single $CH_2=C<$ group; for example, aryl olefins, such as styrene, o-, m-, or p-monochlorostyrene, methyl styrene, such as o-, m-, or p-methyl styrene, and the like.

In the practice of my invention, it is advantageous to employ synthetic rubbers containing about 0.5% cross-linked divinyl compound. Particularly advantageous results have been obtained with compositions containing rubberlike butadiene-styrene copolymers containing about 0.5% cross-linked divinyl benzene. A typical polymerizable mixture contains 72 parts butadiene, 27.5 parts styrene, and 0.5 part divinyl benzene.

The resinous material employed in conjunction with the cross-linked rubberlike polymers mentioned above may be any of a number of resinous materials commonly used as tackifier resins in the preparation of adhesive compositions. In most compositions, the resinous material serves as a tackifier resin. However, in some compositions, depending upon the particular synthetic rubber and the particular resin, the resinous material may function as a toughening agent or as a material present to give alkali resistance to the composition. Typical examples of tackfier resins which may be employed in producing the compositions of my invention are: fossil resins, which are generally low molecular weight hydrocarbon resins such as those fossil resins extracted from Utah fossils; coumarone-indene resins; rosins; hydrogenated rosin; and the like. The particular tackifier resin to be used depends, among other things, upon the properties desired and the particular synthetic rubber employed in the composition. Mixtures of tackifier resins may also be used.

I have obtained particularly advantageous results with a composition containing a rubberlike butadiene-styrene copolymer having about 0.5% cross-linked divinyl benzene therein, and a fossil resin extracted from Utah fossils. In this composition, the resin imparts alkali resistance, film strength, and tack to the adhesive.

The rubber-resin mixture is dispersed in a suitable solvent, the nature of which depends, among other things, upon the particular type of rubber present in the composition and the drying rate required for the particular adhesive. For example, in compositions containing rubberlike butadiene-styrene copolymers, any of a number of hydrocarbon solvents may be employed, a typical solvent being a naphtha with the following distillation range:

| | |
|---|---|
| Initial boiling point | 91° C. |
| 50% | 97° to 100° C. |
| 90% | 103° C. |
| Dry end point | 112° C. |

When rubberlike butadiene-acrylonitrile copolymers are present in the composition, polar solvents such as methyl ethyl ketone may be used.

In order to obtain the desired characteristics, it is advantageous to compound the material to such proportions that the cross-linked rubber is between about 15% to 20% by weight of the composition. The per cent resin may be varied, but the total solids content of the composition should be between about 35% and 45%.

In producing the adhesive compositions of my invention, the rubber and resin are mixed in a suitable mixing device, such as a Banbury mixer, and then dissolved in the solvent in a Werner-Pfleiderer mixer. The material may be readily removed from the mixer, and after standing for a short period of time, a gel-like material results, which can be readily trowelled. If desired, the solvent can be added directly to the rubber and resin mixture in a mixer such as a Werner-Pfleiderer mixer.

My invention may be more readily understood by the following specific examples, which are given by way of illustration and not by limitation.

Example I

| | Parts by weight |
|---|---|
| Rubberlike butadiene-styrene copolymer containing .5 part of cross-linked divinyl benzene | 20 |
| Utah fossil resin | 20 |
| Naphtha | 60 |

Example II

| | Parts by weight |
|---|---|
| Cross-linked polymer of Example I | 18.5 |
| Utah fossil resin | 21.5 |
| Naphtha | 60 |

Example III

| | Parts by weight |
|---|---|
| Cross-linked polymer of Example I | 20 |
| Coumarone-indene resin | 20 |
| Naphtha | 60 |

Example IV

| | Parts by weight |
|---|---|
| Cross-linked polymer of Example I | 15 |
| Utah fossil resin | 25 |
| Naphtha | 60 |

The Utah fossil resin of Examples I, II, and III is sold to the trade by Interchemical Corporation under the designation RBH #510.

The compositions of my invention may be trowelled readily and yet contain comparatively low solids. The compositions are suitable in a wide variety of applications where a trowellable adhesive is desired, and are particularly suitable for the installation of floor coverings, wall coverings, sink tops, and the like.

I claim:

1. A trowellable adhesive composition comprising a tackifier resin and a synthetic rubber containing .01% to .5% by weight of a compound having the general formula:

$$CH_2=C-A-C=CH_2$$
$$\phantom{CH_2=C-}R\phantom{-A-C=}R$$

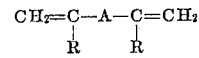

where A represents a member of the group consisting of phenylene, naphthalene, and diphenylene, and R represents a member of the group consisting of hydrogen, methyl, and ethyl, said rubber-resin mixture being dissolved in a solvent and said composition containing about 15% to 25% by weight of said synthetic rubber with a total solids content between about 35% and 45%, said synthetic rubber being produced from polymerizable materials of the group consisting of butadiene-1,3, isoprene, 2,3-dimethyl-butadiene-1,3, piperylene, chloroprene, and mixtures of such butadienes-1,3 with other polymerizable compounds having a single $CH_2=C<$ group which are copolymerizable with butadiene-1,3.

2. A trowellable adhesive composition containing between about 35% and 45% solids and including a tackifier resin and about 15% to 25% of a rubberlike butadiene-styrene copolymer containing .01% to .5% cross-linked divinyl benzene, said materials being dissolved in a hydrocarbon solvent.

3. A trowellable adhesive composition containing between about 35% and 45% solids and including a tackifier resin and about 15% to 25% of a rubberlike butadiene-styrene copolymer containing about .5% cross-linked divinyl benzene, said materials being dissolved in a hydrocarbon solvent.

4. A trowellable adhesive composition containing between about 35% and 45% solids and including a Utah fossil resin and about 15% to 25% of a rubberlike butadiene-styrene copolymer containing .01% to .5% cross-linked divinyl benzene, said materials being dissolved in a hydrocarbon solvent.

5. A trowellable adhesive composition containing between about 35% and 45% solids and including a tackifier resin and about 15% to 25% of a rubberlike butadiene-acrylonitrile copolymer containing .01% to .5% cross-linked divinyl benzene, said materials being dissolved in a polar solvent.

6. A trowellable adhesive composition containing between about 35% and 45% solids and including a coumarone-indene resin and about 15% to 25% of a rubberlike butadiene-styrene copolymer containing .01% to .5% cross-linked divinyl benzene, said materials being dissolved in a hydrocarbon solvent.

7. A trowellable adhesive composition containing between about 35% and 45% solids and including a coumarone-indene resin and about 15% to 25% of a rubberlike butadiene-styrene copolymer containing about .5% cross-linked divinyl benzene, said materials being dissolved in a hydrocarbon solvent.

HILBERT L. STEVENS.

References Cited in the file of this patent

UNITED STATES PATENTS

| Number | Name | Date |
|---|---|---|
| 2,461,551 | Lee et al. | Feb. 15, 1949 |
| 2,461,552 | Radi | Feb. 15, 1949 |
| 2,474,807 | Schoene | July 5, 1949 |